United States Patent
Eiselt et al.

(10) Patent No.: US 9,800,342 B2
(45) Date of Patent: Oct. 24, 2017

(54) OPTICAL WDM TRANSMISSION NETWORK

(71) Applicant: ADVA Optical Networking SE, Meiningen (DE)

(72) Inventors: Michael Eiselt, Kirchheim (DE); Klaus Grobe, Planegg (DE)

(73) Assignee: Adva Optical Networking SE, Meiningen (DE)

( * ) Notice: Subject to any disclaimer, the term of this patent is extended or adjusted under 35 U.S.C. 154(b) by 0 days.

(21) Appl. No.: 15/091,611

(22) Filed: Apr. 6, 2016

(65) Prior Publication Data
US 2016/0329966 A1 Nov. 10, 2016

(30) Foreign Application Priority Data
May 6, 2015 (EP) .................................. 15 166 648

(51) Int. Cl.
| | |
|---|---|
| *H04B 10/00* | (2013.01) |
| *H04B 10/272* | (2013.01) |
| *H04J 14/02* | (2006.01) |
| *H04B 10/25* | (2013.01) |

(52) U.S. Cl.
CPC ....... *H04B 10/272* (2013.01); *H04B 10/2503* (2013.01); *H04J 14/02* (2013.01); *H04J 14/025* (2013.01); *H04J 14/0246* (2013.01); *H04J 14/0282* (2013.01); *H04J 2014/0253* (2013.01)

(58) Field of Classification Search
USPC ...................................................... 398/66–73
See application file for complete search history.

(56) References Cited

U.S. PATENT DOCUMENTS

| | | | | |
|---|---|---|---|---|
| 7,254,340 | B2 * | 8/2007 | Jung | H04B 10/2587 398/169 |
| 7,471,899 | B2 * | 12/2008 | Kim | H04J 14/0226 398/63 |
| 8,315,522 | B2 * | 11/2012 | Urino | H04J 14/02 398/68 |
| 8,335,432 | B1 * | 12/2012 | Darcie | H04J 14/0257 398/58 |
| 8,532,485 | B2 * | 9/2013 | Frigo | H04J 14/0227 398/59 |
| 8,538,259 | B2 * | 9/2013 | Kai | H04J 14/0226 398/48 |

(Continued)

FOREIGN PATENT DOCUMENTS

| | | |
|---|---|---|
| EP | 2475121 A1 | 7/2012 |
| JP | 200779460 A | 3/2007 |

OTHER PUBLICATIONS

Choi et al., "Mobile Backhaul Optical Access Networks for Coordinated Multipoint Transmission / Reception (CoMP) Techniques in Future Cellular Systems," IEICE Transactions on Electronics, Feb. 2013, pp. 147-155, vol. E96-C, No. 2.

(Continued)

*Primary Examiner* — Agustin Bello
(74) *Attorney, Agent, or Firm* — The Webb Law Firm (57) ABSTRACT

The invention relates to an optical WDM transmission network including at least one optical line terminal, a remote node and a plurality of optical network units. The at least one optical line terminal is connected to the optical remote node via an optical WDM path. Each optical network unit is connected to the optical remote node via an optical distribution path.

16 Claims, 6 Drawing Sheets

(56) References Cited

U.S. PATENT DOCUMENTS

| | | | | |
|---|---|---|---|---|
| 8,837,943 B2* | 9/2014 | Choi | ................ | H04J 14/0235 398/153 |
| 9,172,492 B2* | 10/2015 | Lee | ................ | H04J 14/0232 |
| 9,379,877 B2* | 6/2016 | Mizutani | ................ | H04J 3/0605 |
| 2005/0047784 A1* | 3/2005 | Jung | ................ | H04B 10/2587 398/72 |
| 2005/0147412 A1* | 7/2005 | Park | ................ | H04J 14/0227 398/72 |
| 2005/0259988 A1 | 11/2005 | Jung et al. | | |
| 2006/0104638 A1* | 5/2006 | Chung | ................ | H04J 14/0226 398/71 |
| 2006/0153565 A1* | 7/2006 | Park | ................ | H04J 14/0226 398/71 |
| 2007/0212072 A1* | 9/2007 | Iannone | ................ | H04J 14/0226 398/72 |
| 2009/0290866 A1* | 11/2009 | Chung | ................ | H04J 14/0226 398/5 |
| 2010/0266283 A1* | 10/2010 | Beckett | ................ | H04J 14/02 398/68 |
| 2011/0064410 A1* | 3/2011 | Beckett | ................ | H04J 14/02 398/63 |
| 2012/0128360 A1* | 5/2012 | Lee | ................ | H04J 14/0239 398/72 |
| 2012/0177373 A1* | 7/2012 | Choi | ................ | H04J 14/0235 398/72 |
| 2013/0183039 A1* | 7/2013 | Hood | ................ | H04J 14/0234 398/72 |
| 2013/0209105 A1* | 8/2013 | Jeong | ................ | H04J 14/0282 398/72 |
| 2013/0272701 A1* | 10/2013 | Kuri | ................ | H04J 14/0212 398/45 |
| 2013/0294288 A1* | 11/2013 | Choi | ................ | H04L 47/745 370/254 |
| 2014/0178076 A1* | 6/2014 | Fang | ................ | H04J 14/0238 398/98 |
| 2015/0222361 A1* | 8/2015 | Dhaini | ................ | H04J 14/0282 398/66 |
| 2016/0036551 A1* | 2/2016 | Lam | ................ | H04J 14/0242 398/49 |
| 2016/0329966 A1* | 11/2016 | Eiselt | ................ | H04J 14/0246 |
| 2016/0329984 A1* | 11/2016 | Rafel Porti | ................ | H04J 14/0246 |

OTHER PUBLICATIONS

Jung et al., "Wavelength-Division-Multiplexed Passive Optical Network Based on Spectrum-Slicing Techniques," IEEE Photonics Technology Letters, Sep. 1998, pp. 1334-1336, vol. 10, No. 9.

Yamakawa et al., "Wavelength VPN in the Enterprise Network with Loop Back AWG," 15th OptoElectronics and communications Conference Technical Digest, Jul. 2010, pp. 104-105, Sapporo Convention Center, Japan.

Hang et al., "A Novel WDM EPON Architecture with Wavelength Spatial Reuse in High-Speed Access Networks," 15th IEEE International Conference on Networks, Nov. 2007, pp. 155-160.

* cited by examiner

Fig. 1

|       | $B_1$ | $B_2$ | ... | $B_{N-1}$ | $B_N$ |
|-------|-------|-------|-----|-----------|-------|
| $F_1$ | 0     | 1     | ... | N-2       | N-1   |
| $F_2$ | N-1   | 0     | ... | N-3       | N-2   |
| ...   | ...   | ...   | ... | ...       | ...   |
| $F_{N-1}$ | 2 | 3     | ... | 0         | 1     |
| $F_N$ | 1     | 2     | ... | N-1       | 0     |

| N=8 | |
|---|---|
| 1 ↔ 2 | |
| 3 ↔ 7 | |
| 4 ↔ 6 | |
| 5 ↔ 8 | |

Fig. 5a

| N=16 | |
|---|---|
| 1 ↔ 9 | |
| 2 ↔ 4 | |
| 3 ↔ 6 | |
| 5 ↔ 12 | |
| 7 ↔ 11 | |
| 8 ↔ 13 | |
| 10 ↔ 16 | |
| 14 ↔ 15 | |

Fig. 5b

| N=24 | |
|---|---|
| 1 ↔ 8 | |
| 2 ↔ 22 | |
| 3 ↔ 5 | |
| 4 ↔ 15 | |
| 6 ↔ 9 | |
| 7 ↔ 19 | |
| 10 ↔ 18 | |
| 11 ↔ 20 | |
| 12 ↔ 13 | |
| 14 ↔ 24 | |
| 16 ↔ 21 | |
| 17 ↔ 23 | |

OPTICAL WDM TRANSMISSION NETWORK

CROSS-REFERENCE TO RELATED APPLICATION

This application claims priority to European Patent Application No. 15 166 648.4 filed May 6, 2015, the disclosure of which is hereby incorporated in its entirety by reference.

BACKGROUND OF THE INVENTION

Field of the Invention

The invention relates to an optical WDM transmission network.

Description of Related Art

A communication system comprising an optical line terminal (OLT), also referred to as head end, central node or hub, which is connected to a plurality of optical network terminals (ONTs) or optical network units (ONUs) by a remote node, often referred to as remote node (RN), is commonly designated as passive optical network (PON). In such a PON, the OLT realizes an interface between an access network and a backbone network to which the OLT is connected. The traffic of signals between the OLT and the remote node is realized in form of optical WDM transmission signals (downstream and upstream) comprising a given number of optical channel signals. Each optical channel signal is created at a dedicated (channel) wavelength out of a predetermined number of channel wavelengths. The so-called OLT traffic comprises all point-to-point transmission links, each point-to-point transmission link being realized by a pair of downstream and upstream channel signals at dedicated wavelengths. The downstream WDM signal is split at the remote node into the single channel signals that are transmitted to the respective ONUs. The upstream channel signals created in the ONUs are combined at the remote node to form the upstream WDM signal that is transmitted to the OLT.

Such a PON has the advantage that the connection network between the OLT and the ONU is a fully passive network that can be realized and maintained at low cost. Further, such a passive connection network does not require any power supply.

It is noted that, within the present description, the terms OLT, RN, ONU and PON shall be understood in their broadest sense and are not restricted to the specific term of a passive optical network as used in the literature. Rather, the terms OLT, RN and ONU designate the general devices realizing a central network node configured to transmit and receive a respective downstream and upstream optical WDM signal, a network node configured to split the downstream optical WDM signal and combine the upstream optical channel signals (constituting the OLT traffic) and a network node configured to receive and transmit respective channel signals, respectively.

In such communication networks, it might be advantageous to allow for direct communication between the ONUs via the remote node. Such direct transmission links have a generally lower latency than corresponding transmission links which are realized through signals that are transmitted the whole way from an ONU to the OLT and from the OLT to the selected further ONU. As described in EP 2 475 121 A1, such a network realizing OLT traffic and simultaneously allowing for realizing a star structure by providing star links (each star link realized between two selected ONUs via the remote node) may be used to connect a plurality of base stations to a central switching unit in a mobile backhaul access network and to simultaneously allow for direct connections between the base stations via an optical multiplexer/demultiplexer, which realizes a remote node in the above-explained terminology. The remote node is realized by a cyclic N×N arrayed waveguide grating (AWG) wherein the ONUs are connected by a single optical fiber to a dedicated back port of the N×N AWG and the central node or OLT is connected to a selected front port of the N×N AWG. In order to provide star links between one or more selected pairs of ONUs, the remaining front ports of the N×N AWG are connected to the input ports of a first optical splitter/combiner device the common output port of which is connected to the front port of the N×N AWG to which the central node or OLT is connected. For this purpose, a second splitter/combiner device may be used wherein the optical fiber or path connecting the OLT is connected to a first splitting port of the splitter/combiner device and the common output port of the first splitter/combiner device is connected to a second splitting port of the second splitter/combiner device. The common port of the second splitter/combiner device is connected to the respective front port of the N×N AWG. In this way, a selected ONU may create a star link channel signal which is supplied to the respective back port of the N×N AWG at a predetermined channel wavelength, the predetermined wavelength being chosen in such a way that the star link channel signal is rooted from the respective back port to the front port that is connected to the back port at the predetermined wavelength. The first and second splitter/combiner devices supply the respective star link channel signal to the front port of the N×N AWG which also receives the downstream WDM signal created by the OLT. The star link channel signal is then routed to the back port of the N×N AWG that is connected to this front port at the given wavelength. In this way, the star link channel signal at the respective wavelength is supplied to the ONU which is connected to the respective back port of the N×N AWG. In this way, a selected ONU is able to transmit a star link channel signal to a selected further ONU by appropriately choosing the channel wavelength of the star link channel signal.

In order to create an upstream channel signal for the OLT traffic and an additional star link channel signal, two separate optical sources, especially lasers, may be provided within an OLT. Likewise, two photodetectors may be provided for receiving the downstream channel signal and a further star link channel signal.

In order to avoid collisions between downstream and upstream channel signals, EP 2 475 121 A1 suggests using a different band or order of the cyclic N×N AWG for the star link channel signals.

According to the communication system and method disclosed in EP 2 475 121 A1, each star link channel signal encounters the attenuation introduced by the two additional splitter/combiner devices. Thus, especially for a low-budget communication system that uses an N×N AWG having a higher number N of front and back ports, the attenuation caused by the first splitter/combiner device becomes inacceptable.

SUMMARY OF THE INVENTION

It is thus an object of the present invention to provide an optical WDM transmission network which provides for bidirectional connections between each ONU and the OLT as well as for direct connections between one or more pairs of ONUs via the remote node and which can be realized at low cost.

It is a finding of the invention that the costs of realizing the network can be drastically reduced if all ONUs are designed identically, at least as far as the design of the optical receiver portion is concerned.

As the conventional WDM transmission system in EP 2 475 121 A1 the network according to the present invention uses different wavelength bands for the optical downstream and upstream channel signals, that is for the OLT traffic, and for the optical star link channel signals. It is of course also possible to additionally use different bands for the optical upstream channel signals and the optical downstream channel signals.

The remote node according to the present invention also has wavelength-depending routing properties which are configured in such a way that bidirectional hub links via the remote node between the at least one optical line terminal and each of the optical network units can be established and are further configured in such a way that direct bidirectional star links via the remote node between one or more selected optical network units and at least one of the other optical network units can be established. The remote node preferably reveals a cyclic behavior, i.e., the wavelength-dependent routing properties are essentially identical in two or more neighboring optical bands or orders of the remote node. As in the prior art such a remote node can easily be realized by a cyclic N×N AWG. The optical bands used for the optical downstream channel signals, the optical upstream channel signals and the optical star link channel signals are defined by the bandwidth or order of the AWG also referred to as free spectral range. Of course, the optical bands used for the optical downstream channel signals and the optical star link channel signals do not overlap. The optical bands used for the optical downstream channel signals and the optical upstream channel signals, i.e. the first and second optical bands in embodiments in which a single hub link is established between the OLT and an ONU, may be different or identical.

In order to make an identical design of the ONUs possible, each ONU comprises a first optical receiver for receiving a respective optical downstream channel signal created in the OLT and at least one second optical receiver for receiving an optical star link channel signal created in another ONU. The first optical receiver is coupled to a first band port of an optical band filter device and the at least one second optical receiver is coupled to a second band port of the optical band filter device. The optical band filter device is configured to separate optical channel signals supplied to a common port of the band filter device lying in different bands (or) orders of the remote node and outputs a downstream channel signal supplied to the common port at the first band port and a star link channel signal supplied to the common port at the second band port. In this way, all ONUs may be realized using identically designed optical band filters (i.e. band filters having an identical construction and having the same part number) which can be purchased in higher quantities and therefore at a lower price.

Of course, it would also be possible to use the third optical band, which is generally used for establishing star links, for establishing a further hub link. For this purpose, the OLT may create an optical downstream channel signal at a channel wavelength within the third optical band that is routed to the respective ONU. The optical band filter in this ONU routes this downstream channel signal to the second receiver which was originally provided to establish a star link.

According to the invention, an ONU includes at least one optical transmitter. If an ONU includes a single optical transmitter only, this optical transmitter may be configured to create an optical channel signal at a wavelength lying within the second (upstream) optical band and/or within the third optical band that is used for establishing star links. That is, the single optical transmitter may either be configured to create an optical upstream channel signal that is used to establish a hub link or an optical star link channel signal that is used to establish a star link, or the optical transmitter may be realized as tunable optical transmitter which is capable of selectively creating both an optical upstream channel signal and an optical star link channel signal. However, selected one or more or all optical network units may comprise a first optical transmitter adapted to create the respective optical upstream channel signal for establishing the hub link at a dedicated wavelength lying in the second optical band, and a second optical transmitter adapted to create an optical star link channel signal for establishing a direct star link at a dedicated wavelength lying in the third band, the optical upstream and star link channel signals created by the first and the at least one second transmitters being supplied to a connection port of the optical network unit.

In this way, it is possible for an ONU to simultaneously establish a hub link and a star link.

According to a further embodiment of the invention, each or selected optical network units further comprise a second optical band filter device having a common port and a first and a second band port, a first optical transmitter connected to the first band port and a second optical transmitter coupled to the second band port, the first optical transmitter being adapted to create an optical downstream channel signal at a channel wavelength lying in the second band for establishing a hub link and the second optical transmitter adapted to create an optical channel signal at a channel wavelength lying in the third band for establishing a direct star link, wherein the second optical band filter device is configured to route the optical channel signal created by the first optical transmitter and supplied to the first band port to the common port and to route the optical channel signal created by the second optical transmitter and supplied to the second band port to the common port and wherein the second optical band filter device preferably reveals an identical design as the first optical band filter device.

This embodiment reveals the advantage that identical optical band filter devices can be used for the transmitter unit comprising the at least two optical transmitters and for the receiver unit comprising and the at least two optical receivers. This reduces the costs for the ONU design as only a single type of an optical band filter device is used which can be ordered in a higher number of pieces.

According to another embodiment of the invention, the second optical transmitter is a tunable optical source, preferably a tunable optical laser, the tunable optical source being able to create an optical star link channel signal having any desired wavelength within the third band.

While for establishing a hub link the respective optical transmitter may be a fixed wavelength optical transmitter, a tunable optical transmitter is required in order to enable an ONU to establish a star link with an arbitrary other ONU at a dedicated optical channel, that is a respective optical channel wavelength. The optical channel wavelength that must be used for establishing a star link is defined by the routing properties of the remote node and the specific port of the remote node to which the respective ONU is connected. If a predetermined optical band is used for establishing the star link, it is sufficient for a respective tunable optical transmitter comprised within an ONU to be tunable within this optical band.

According to the invention, it is of course possible to use more than one second optical transmitter and a respective number of second optical receivers for establishing a respective higher number of star links. In such embodiments, it is preferred to use different (non-overlapping) optical bands for each star link that is terminated in the same ONU. That is, a first one of the second optical transmitters uses a first one of the third optical bands and a second one of the second optical transmitters uses a second one of the third optical bands. Therefore, it is sufficient if the tuning range of a respective tunable optical transmitter covers the respective optical band, only.

In such embodiments, the optical band filter device has a respective higher number of band ports, wherein each of the band ports can selectively be used for establishing a further hub link communication between the respective ONU and the OLT or a further star link communication between the respective ONU and another ONU. It is of course also possible to use such further optical transmitters and receivers exclusively for realizing an additional hub link or exclusively for realizing an additional star link communication.

According to a preferred embodiment of the invention, the remote node comprises a cyclic N×N AWG, wherein the optical bands used for the hub links and the star links are defined by the orders of the AWG. In other words, the bandwidth of an optical band corresponds to the free spectral range of the AWG.

In one possible embodiment, the OLT and the ONUs are connected to the remote node using two separate optical paths or optical fibers for the signals received by and created by the OLT and the ONUs, respectively, i.e. dual-fiber working is used for the respective connections. In such embodiments, each respective node, i.e. either the OLT or an ONU, reveals a connection port comprising a separate output port and a separate input port, wherein the output port is connected to a selected front port of the AWG and the input port is connected to a selected back port of the AWG. Thus, in such embodiments, a connection port of the remote node is defined by a pair of a dedicated front port and a dedicated back port of the N×N AWG.

It may be advantageous to connect a node (i.e., the OLT or an ONU) in such a way to the remote node that the output port of the respective node is connected to an arbitrary front port of the N×N AWG and that the input port of the respective node is connected to the back port of the N×N AWG that has the same port number i, wherein 1≤i≤N. As a result, the same channel wavelength transmitted by the respective node to the remote node (e.g., the channel wavelength $\lambda_0$) is routed back to the input port of the node. Transmitting a signal at this channel wavelength can therefore be used to detect an interruption of the respective transmission path comprising the optical fiber between the output port of the node and the respective front port of the N×N AWG and the fiber between the respective back port of the N×N AWG and the input port of the transmitting node.

According to another embodiment, the optical line terminal and each optical network unit have a connection port comprising a combined input/output port, wherein the respective input/output port is connected to a dedicated front port of the cyclic N×N AWG by a single optical path, for example an optical fiber, which is used for both signal directions, and wherein the back ports of the cyclic N×N AWG are connected pairwise. This embodiment is especially advantageous when a cyclic N×N AWG is used having an even number of N front and N back ports.

It is preferred in such embodiments to effect the pairwise connection of the back ports of the cyclic N×N arrayed waveguide grating in such a manner that all possible differences between the numbers of the connected back ports taken modulo N cover all numbers from 1 to N−1. In this way, it can be assured that each node, that is the OLT and each of the ONUs, can transmit an optical channel signal to any other node by selecting the required wavelength for the optical channel signal.

According to another embodiment, the optical line terminal and each optical network unit have a connection port comprising a combined input/output port, the input/output port of the optical network units being connected to a respective dedicated front port of the cyclic N×N AWG and the input/output port of the optical line terminal being connected to a dedicated back port of the cyclic N×N AWG, wherein the remaining back ports of the cyclic N×N AWG, are connected pairwise. As the OLT and the ONUs are connected to opposite sides of the AWG, hub links between each ONU and the OLT can be established independently from the selection of pairwise connected backports of the AWG.

In a further embodiment of the invention, the optical line terminal and each optical network unit have a connection port comprising a combined input/output port, wherein the respective input/output port of each optical network unit is connected to a dedicated front port of the cyclic N×N arrayed waveguide grating, wherein the back ports of the cyclic N×N arrayed waveguide grating are connected pairwise, and wherein an optical circulator is provided within an optical connection path, which connects a pair of back ports, and wherein N is preferably even.

This structure of a remote node makes it possible to use a cyclic N×N AWG with even N to connect a number of N ONUs and an OLT using single fiber working.

Also with this structure it is advantageous if the pairwise connection of the back ports of the cyclic N×N arrayed waveguide grating is done in such a manner that all possible differences between the numbers of the connected back ports taken modulo N cover all numbers from 1 to N−1. If additionally an optical circulator is provided within the optical connection path which connects the pair of two ports having the greatest absolute difference of the port numbers, it is possible to establish communication links between each ONU and the OLT and each ONU and a further selected ONU. Of course, each ONU may at the maximum be involved in a number of simultaneously used communication links that corresponds to the number of optical transmitters and receivers comprised by that ONU.

BRIEF DESCRIPTION OF THE DRAWINGS

Further objects and advantages of the present invention will become apparent from the following description of the preferred embodiments that are given by way of example with reference to the accompanying drawings, wherein.

DETAILED DESCRIPTION OF THE INVENTION

Figure 1:
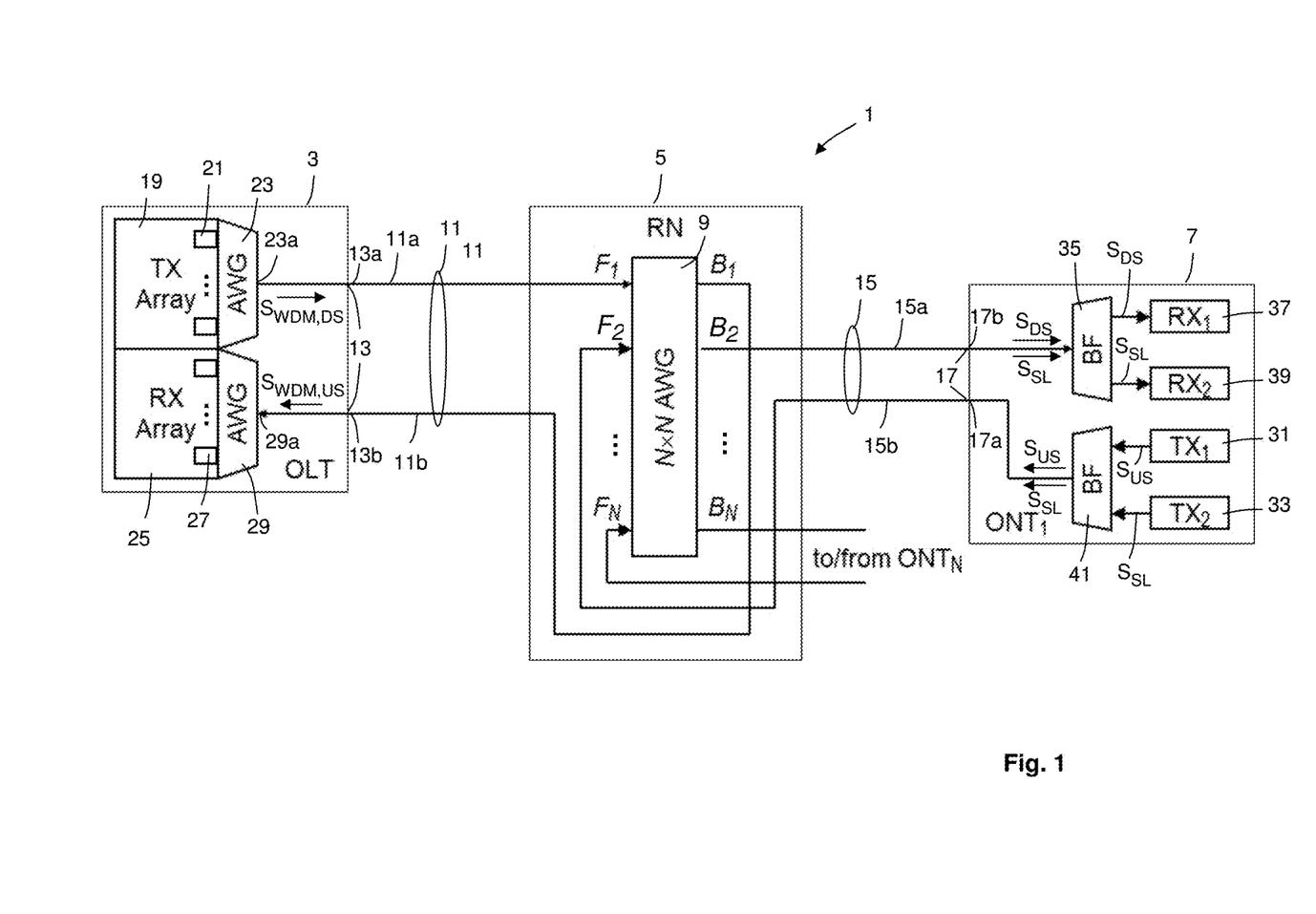
FIG. 1 shows a schematic block diagram of a PON comprising a single OLT and a plurality of ONUs, which are connected to a remote node.

FIG. 1 shows an optical WDM transmission network 1 that is realized as a PON (in the following description also designated by the reference numeral 1) comprising an OLT 3, an RN 5 and a plurality of ONUs 7. The RN 5 comprises an N×N AWG 9 having N front ports $F_1$ to $F_N$ and N back ports $B_1$ to $B_N$. In the embodiment shown in FIG. 1, the OLT 3 is connected to the RN 5 by an optical WDM path 11 realized by separate feeder fibers 11a, 11b for the downstream and upstream directions, respectively. The downstream feeder fiber 11a connects an output port 13a of the OLT 3 to the front port F1 of the N×N AWG. Likewise, the upstream feeder fiber 11b connects the back port B1 of the N×N AWG 9 to an input port 13b of the OLT 3. The output port 13a and the input port 13b form an optical connection port of the OLT 3. Each ONU 7 is connected to the RN 5 via an optical distribution path 15, which is realized by a downstream distribution fiber 13a and an upstream distribution fiber 13b. As shown in FIG. 1, the downstream distribution fiber 15a of an ONU 7 connects a dedicated back port $B_i$ of the N×N AWG 9 to an input port 17b of the ONU 7 and the upstream distribution fiber 15b connects an output port 17a of the ONU 7, to a dedicated front port $F_i$ of the N×N AWG 9. The output and input ports 17a, 17b of the ONU 7 and each pair of a front port $F_i$ and a back port $B_i$ form an optical connection port of the RN 5 or the N×N AWG 9, respectively. The output port 17a and the input port 17b of an ONU 7 form an optical connection port 17. Thus, in the embodiment shown in FIG. 1, both the OLT 3 and each ONU 7 are connected to the RN 5 using dual-fiber working. It is of course possible to connect more than a single OLT 3 to a plurality of ONUs through an RN 5, wherein the number N of connection ports of the RN 5 that are defined by the number N of front ports $F_i$ and backports $B_i$ of the AWG limits the maximum number of network nodes, i.e. the sum of the numbers of OLTs 3 and ONUs 7.

Of course, it would also be possible to connect the downstream feeder fiber 11a and the upstream distribution fibers 13b to arbitrarily dedicated front ports $F_m$ and the upstream feeder fiber 11b and the downstream distribution fibers 13a to arbitrarily dedicated back ports $B_n$ (1≤m≤N and 1≤n≤N, m≠n). This would of course change the wavelength allocation for establishing hub communication links (shortly referred to as hub links) between the OLT 3 and the ONUs 7 and between one or more pairs of selected ONUs.

The OLT comprises an optical transmitter array 19 including a number of N optical transmitters 21 each of which is adapted to create an optical downstream channel signal $S_{DS}$ at a dedicated channel wavelength $\lambda_j$ (0≤j≤N−1) of the PON 1. The optical transmitters 21 may be tunable optical transmitters, e.g. tunable optical lasers, or fixed wavelength optical transmitters. If tunable optical transmitters are used, each selected optical transmitter 21 may be tuned to a predetermined channel wavelength $\lambda_j$ so that a hub link to a selectable ONU 7 may be established.

The optical channel signals $S_{DS}$ are supplied to respective channel ports of an 1×N AWG 23, which serves as a passive optical unit. An optical downstream WDM signal $S_{WDM, DS}$ including the optical downstream channel signals $S_{DS}$ is output at a WDM port 23a of the AWG 17 and supplied to the output port 13a of the OLT 3. This optical downstream WDM signal $S_{WDM, DS}$ is transmitted to the front port $F_1$ of the N×N AWG 9 and is demultiplexed into the single optical downstream channel signals $S_{DS}$, which are output at the respective back ports $B_i$ of the N×N AWG 9 according to the well-known transmission characteristics of an N×N AWG.

Figure 2:
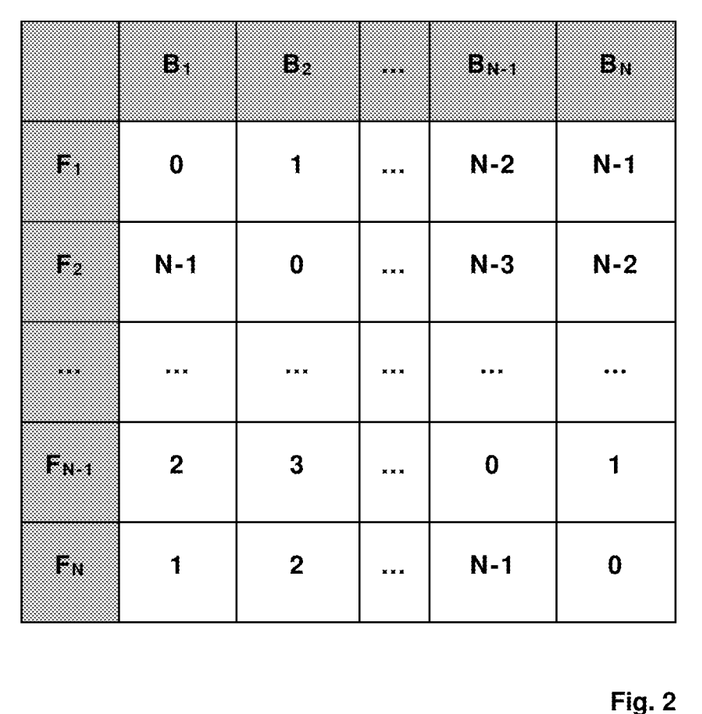
FIG. 2 shows a table visualizing the wavelength-dependent transmission properties between the N front ports F1 to FN and N back ports B1 to BN of an N×N AWG.

FIG. 2 shows the transmission or routing characteristic of an N×N AWG 9, wherein N neighboring channels are defined that have, for example, an optical channel spacing of 100 kHz. In this table, the respective channel wavelengths $\lambda_j$ are referred to by the value of the index j. As apparent from FIG. 2, in the PON 1 according to FIG. 1 the OLT 3 can communicate with the first ONU 7 (connected to the front port $F_2$ and the back port $B_2$ of the N×N AWG 9) using the respective channel wavelength $\lambda_1$ and with the last OLT 7 (connected to the front port $F_N$ and the back port $B_N$ of the N×N AWG 9) using the channel wavelength $\lambda_{N-1}$. Each of the ONUs 7 is able to communicate with the OLT 3 using the respective channel wavelength $\lambda_j$ that is allocated to the respective ONU 7 through the RN 9 (and the respective front port $F_i$ to which the respective upstream distribution fiber 17b is connected). In the embodiment according to FIG. 1, the first ONU 7 can communicate with the OLT 3 through $\lambda_{N-1}$ and the last ONU 7 can communicate with the OLT 3 through $\lambda_1$. The channel wavelength $\lambda_0$ can be used by the OLT 3 to monitor the optical WDM path 11 as a downstream channel signal $S_{DS}$ having a channel wavelength $\lambda_0$ is routed to the back port $F_1$ and is thus supplied to the upstream feeder fiber 11b.

As shown in FIG. 1, the OLT 3 comprises an optical receiver array 25 including a number of N optical receivers 27 each of which is adapted to receive an optical upstream channel signal $S_{US}$ at a dedicated channel wavelength $\lambda_j$ (0≤j≤N−1) of the PON 1. An optical upstream WDM signal $S_{WDM,US}$, which comprises all optical upstream channel signals $S_{US}$ created by the ONUs 7, is supplied to the input port 13b of the OLT 3 and to a WDM input port 29a of a 1×N AWG 29, which serves as an optical demultiplexer. Each of the N channel ports of the 1×N AWG 29 is connected to an input port of one of the optical receivers 27, which thus receives the respective optical upstream channel signal $S_{US}$ that is output at the respective channel port of the 1×N AWG.

As apparent from FIG. 1, each ONU 7 comprises a first optical transmitter 31, which is adapted to create an optical upstream channel signal $S_{US}$ at the channel wavelength allocated by the RN 5. Further, each ONU 7 comprises a second optical transmitter 33, which is adapted to create an optical channel signal $S_{CH}$ at a channel wavelength that is routed by the RN 5 or the N×N AWG 9, respectively, to another ONU 7. This further optical channel signal can therefore be used to establish a bidirectional star communication link between the respective ONU 7 and the respective other ONU 7 via the RN 5. If it is desired that an ONU 7 is able to establish a star communication link to any arbitrary other ONU 7, a tunable second optical transmitter 33 is required.

However, if the channel wavelength for the star link optical channel signal lies within the same optical band as the downstream optical channel signals $S_{DS}$, a high effort would be necessary in the ONUs 7 for separating the optical downstream signal $S_{DS}$ and the respective star link channel signal. A narrow band tunable filter could be used. However, such optical devices are expensive and require additional control.

Thus, the cyclic property of an N×N AWG can be used in order simplify the design of the ONUs 7. Due to this cyclic property, the N×N AWG 9 and thus the RN 5 reveals the same routing characteristic in each order of the AWG, wherein each order defines a respective optical transmission band. Thus, a first optical band $b_1$ defined by a first arbitrary order of the N×N AWG 9 may be used for the optical downstream channel signals $S_{DS}$ (and thus for the optical downstream WDM signal $S_{WDM,DS}$), a second optical band may be used for the optical upstream channel signals $S_{US}$ (and thus for the optical upstream WDM signal $S_{WDM,DS}$) and a third optical band $b_3$ may be used for the optical star link channel signals $S_{SL}$. In the embodiment according to FIG. 1, the first and second optical bands $b_1$, $b_2$ may be identical as dual-fiber working is used for the connection of the OLT 3 and the ONUs 7 to the RN 5. However, also in this case the use of different first and second optical bands $b_1$, $b_2$ may be advantageous to improve the cross-talk behavior of the PON 1.

In order to avoid the requirement of a tunable narrow-band optical filter in the ONU receiver, the second optical transmitter 33 is configured to create the respective optical star link channel signal $S_{SL}$ at a wavelength that lies in a third optical band $b_3$ different from the first optical band $b_1$. In this way, an easy separation of the respective optical downstream channel signal $S_{DS}$ and the respective star link channel signal $S_{SL}$ received at the ONU 7 can be effected by means of a simple band filter.

As shown in FIG. 1, the input port of an ONU 7 is connected to a common port 35a of an optical band filter 35. The band filter 35 is adapted to separate the optical downstream channel signal $S_{DS}$ received and the optical star link channel signal $S_{SL}$. The band filter 35 outputs the optical downstream channel signal $S_{DS}$ at a first band port, which is coupled to a first optical receiver 37 for receiving the optical downstream channel signal $S_{DS}$, and the star link optical channel signal $S_{SL}$ at a second band port, which is coupled to a second optical receiver 39 for receiving a star link optical channel signal $S_{SL}$. The optical band filter may be realized as optical diplexer.

A further optical band filter 41 is used for combining the optical signals created by the first and second optical transmitters 31, 33, i.e., for combining the optical upstream channel signal $S_{US}$ and the optical star link channel signal $S_{SL}$ created in the ONU 7. As apparent from FIG. 1, the signals created by the first and second optical transmitters 31, 33 are supplied to a first and a second band port of the optical band filter 41, which outputs both signals at a common port that is connected to the output port 17a of the ONU 7. Of course, this further optical filter may also be realized as optical diplexer.

Generally, the optical band filters 39, 41 may be designed identically. Even if all three optical bands used for the optical signals $S_{DS}$, $S_{US}$ and $S_{SL}$ are different—they should not overlap at any rate—, it is possible to design an optical filter that separates and/or combines signals lying in the third band (the star link channel signals $S_{SL}$) on the one hand and signals lying in the first and second band (the downstream and upstream channel signals $S_{DS}$ and $S_{UP}$) on the other hand. The use of identical optical devices of rather simple design further reduces the cost for realizing the ONUs 7.

If identical orders of the N×N AWG 9 or optical bands are used for the first and second band, that is for the downstream and upstream optical channel signals $S_{DS}$ and $S_{US}$, simple optical diplexers of identical design can be used as optical band filters 39 and 41. Even when different bands are used for the upstream and downstream direction, optical diplexers 39 and 41 of identical design may be used if the third optical band $b_3$ does not lie between the first and second optical band $b_1$, $b_2$.

A further type of an optical filter that may be used as optical filter 39 or 41 is a periodical optical 3-port filter having a common port and a first and a second band port, wherein neighboring bands of essentially the same width are alternately assigned to the band ports, that is an optical signal supplied to the common port and lying in a first band is output at the first band port, an optical signal supplied to the common port and lying in a neighboring second band is output at the second band port, an optical signal supplied to the common port and lying in a third band neighboring the second band is output at the first band port, and so on. In the same way, an optical signal supplied to the first band port and lying in the first, third etc. band is transmitted to the common port and an optical signal supplied to the second band port and lying in the second, fourth etc. band is transmitted to the common port. This type of optical filter may also be designated as optical interleaver.

Using this filter type alternating optical bands may be used for the hub links, i.e. the signals $S_{DS}$ and $S_{US}$, and for the star links, i.e., the signals $S_{SL}$.

Of course, the tunable optical transmitters 33 creating the signals $S_{SL}$ need to be tunable in the respective band (or order of the N×N AWG 9), only, that is used for the respective star link.

It is also possible to provide more than two optical receivers in an ONU 7. Each optical receiver may then be adapted to receive an optical star link channel signal lying in a predefined optical band. This optical band can be used either for establishing a further hub link with the OLT 3 (or a further OLT) or a further star link with another ONU 7 or even with the same other ONU 7 to which a star link communication already has been established.

A control unit comprised by each ONU 7 (not displayed) may of course be configured to control the optical transmitters 31, 33 (at least the second optical transmitter 33) with respect to the wavelength of the optical signal created. Thus, the control unit determines in which optical channel of the PON 1 the optical channel signal is transmitted. That is, taking into account the cyclic property of the N×N AWG 9 or the RN 5, respectively, the control unit decides whether the (second) tunable optical transmitter 33 creates an optical upstream channel signal (lying in any possible order of the N×N AWG 9 defined by the optical filter 41) that is routed to the OLT 3 or an optical star link channel signal that is routed to another ONU 7.

This behavior is apparent from the table shown in FIG. 2 taking into account the cyclic routing property of the N×N AWG 9, i.e., all channel signals ($S_{DS}$, $S_{US}$, $S_{SL}$) at wavelengths differing by any multiple of the free spectral range of the N×N AWG 9 that are supplied to a selected front port are routed to the same back port of the N×N AWG 9.

Of course, the control unit of an ONU 7 may be configured in such a way that the optical transmitter 33 is never controlled to create a channel signal at the channel wavelength that is routed to the OLT 3 if it is desired that all hub links are restricted to one or more second optical bands $b_2$ and all star links are restricted to one or more third optical bands $b_3$.

It is not necessary at any rate that an ONU 7 comprises a separate optical transmitter for creating an optical upstream channel signal $S_{US}$ and an optical star link channel signal $S_{SL}$ if it is not required to create both signals at the same time. Instead, in this case a single tunable optical transmitter may be used which is controlled, by the control unit, to either create an upstream channel signal $S_{US}$ at the dedicated channel wavelength lying in the optical band used for the hub links or an optical star link channel signal $S_{SL}$ at a dedicated channel wavelength lying in the optical band used for the star links. Of course, such a tunable optical transmitter must be tunable over both bands.

A similar design of an ONU as explained above for a PON using dual-fiber working may be used for a PON using single-fiber working. The only essential difference is an additional optical component for combining and separating the optical paths for the upstream and downstream direction, wherein a single optical distribution fiber is connected to the connection port 17 of the ONU 7. The same applies to the OLT 3. The upstream and downstream ports 13b, 13a would be connected to a suitable optical component for combining and separating the optical paths for the upstream and downstream direction, and a common port of this optical component would define the connection port 13 of the OLT 3 to which a single feeder fiber would be connected. An optical circulator may be used as such an appropriate optical component for combining and separating the respective optical paths.

Figure 3:
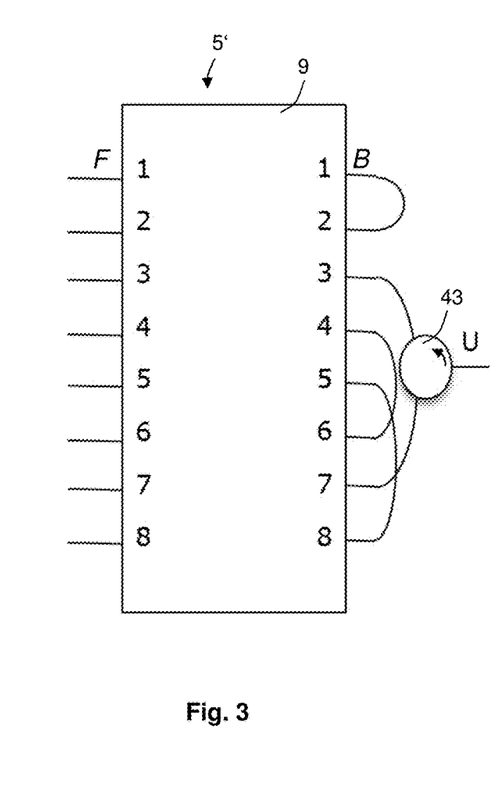
FIG. 3 shows an RN for use in a PON comprising a single OLT and a plurality of ONUs connected by a single optical fiber to the RN, the RN being realized by an 8×8 AWG, wherein the back ports are connected in pairs and an optical circulator is provided within the optical connection of an optical connection path connecting a selected pair of back ports in order to create a further connection port of the RN.

FIG. 3 shows an RN 5' comprising an 8×8 AWG 9 configured, by means of a selected pairwise connection of the back ports $B_1$ to $B_8$, to serve as a remote node in a PON using single-fiber working (not displayed in further detail). Due to the pairwise connection apparent from FIG. 3 (see also the wiring table shown in FIG. 5a), the RN 5 (i.e. the wired 8×8 AWG 9) shows the routing characteristic as shown in FIG. 4b, wherein the first line of the table shows the number of the front port $F_{out}$ to which a channel signal ($S_{DS}$, $S_{US}$ or $S_{SL}$) is routed that is supplied to another front port $F_{in}$, the number of the front ports serving as an input port being displayed in the first column of the table in FIG. 4b. Further, this table includes an additional connection port U, which is created by an optical circulator 43 provided within the connection of the back ports $B_3$ and $B_7$, wherein the optical circulator outputs a channel signal supplied to the connection port U to the back port $B_3$ and outputs the channel signal supplied to the respective circulator port from the back port $B_7$ at the connection port U.

The additional connection port U may, for example, be used for connecting the OLT in a PON according to FIG. 1 modified for single-fiber working as explained above. However, as apparent from the table in FIG. 4b, each connection port of the RN 5' defined by the front ports $F_1$ to $F_8$ of the N×N AWG 8 and the connection port U of the N×N AWG 9 defined by the optical circulator 43 can be reached by a channel signal at a dedicated channel wavelength that is supplied to any other connection port in any order of the N×N AWG 9.

Figure 4A:
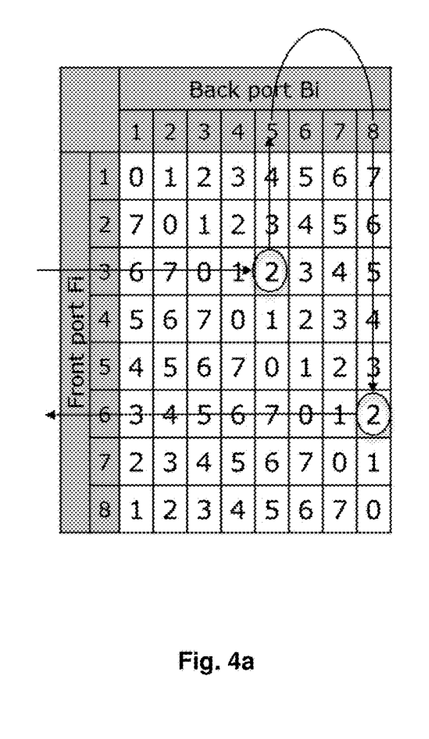
FIGS. 4a-4b show two tables visualizing the wavelength dependent transmission properties of the RN in FIG. 3 defined by the eight front ports and the eight back ports of the AWG and the connection port, i.e. the free port, of the optical circulator.
Figure 4B:
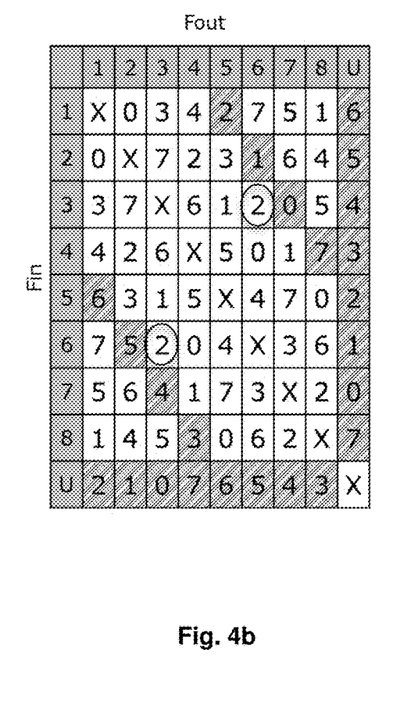

The routing matrix of the RN 5' shown in FIG. 4b can easily be set up using the transmission or routing characteristic of an 8×8 AWG shown in FIG. 4a, which corresponds to the general routing table of an N×N AWG according to FIG. 2. As an example, the routing characteristic of the RN 5' for a channel signal ($S_{DS}$, $S_{US}$ or $S_{SL}$) supplied to the front port $F_3$ at a channel wavelength $\lambda_2$ shall be regarded. As apparent from FIG. 4a this signal is routed to the back port $B_5$. As the back port $B_5$ is connected to the back port $B_8$, the channel signal at the channel wavelength $\lambda_2$ is routed to the front port $F_6$. In this way, the routing matrix shown in FIG. 4b can be set up step by step.

As apparent from the table in FIG. 4b, the routing matrix is only partly symmetrical, i.e. not all connections between selected pairs of connection ports are established at the same channel wavelength in both transmission directions. The connections represented by the wavelengths (and the respective connection ports) that are displayed hatched in FIG. 4, i.e., all connections between the connection port U and a front port $F_1$ to $F_8$ and vice versa, the connection from port $F_1$ to $F_5$ and vice versa, the connection from port $F_2$ to $F_6$ and vice versa, the connection from port $F_3$ to $F_7$ and vice versa and the connection from port $F_4$ to $F_8$ and vice versa are established using different channel wavelengths for the two transmission directions. This asymmetry is caused by the circulator 43, wherein all routes that comprise the optical connection between the back ports $B_3$ and $B_7$ (and thus comprise the optical circulator 43) are affected.

Here, it shall again be mentioned that the term "channel wavelength" and the respective reference sign $\lambda_j$ ($0 \leq j \leq N-1$) designate all wavelengths in the cyclic bands of the RN 5, 7' (or orders of the N×N AWG 9) that are routed in the same way. Of course, these wavelengths differ by an integer multiple of the free spectral range of the N×N AWG 9.

In order to accomplish a full connectivity between an arbitrary pair of connection ports, the following requirement concerning the pairwise connection of the back ports (irrespective of whether or not the connection comprises the optical circulator 43) must be met: The differences between the numbers of the connected back ports modulo N (i.e., the number of back ports of the N×N AWG 9) must cover all integer values from 1 to N−1. This might not be achievable for all port counts N, for example for the port counts N=4, N=6 and N=12.

For the embodiment in FIG. 3 of an 8×8 AWG 9, the following differences according to the above calculation rule exist:

Back port $B_1$ connected to back port $B_2$: d=±1; D=1, D=7
Back port $B_3$ connected to back port $B_7$: d=±4; D=4
Back port $B_4$ connected to back port $B_6$: d=±2; D=2, D=6
Back port $B_5$ connected to back port $B_8$: d=±3; D=3, D=5 wherein d designates the difference including the sign and D designates the modulo 8 (N=8) value of the differences d (for both the positive and negative value of d). As was demonstrated, the values for D cover all integer values between D=1 and D=7, that is D=N−1 for N=8.

Further, the optical circulator must be provided within the connection of the pair of back ports, where the difference of the port numbers equals one half of the port count N.

Figure 5A:
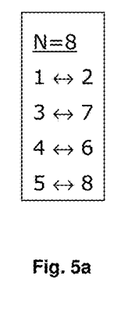
FIGS. 5a-5c show three tables representing possible pair-wise connections of the back ports of a RN according to FIG. 3 comprising an N×N AWG for N=8 (FIG. 5a), N=16 (FIG. 5b) and N=24 (FIG. 5c)
Figure 5B:
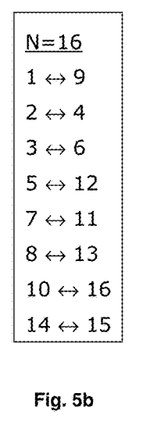

Further examples for an RN 5' comprising a 16×16 AWG 9 and a 24×24 AWG in which the above condition is met are described below with reference to FIG. 5:

As apparent from the table in FIG. 5a, the following back ports are to be connected if a 16×16 AWG is used in an RN 5', wherein the port numbers are given, only: 1 ↔ 9, 2 ↔ 4, 3 ↔ 6, 5 ↔ 12, 7 ↔ 11, 8 ↔ 13, 10 ↔ 16, 14 ↔ 15. Here, the circulator 43 is provided in the connection 1 ↔ 9.

Figure 5C:
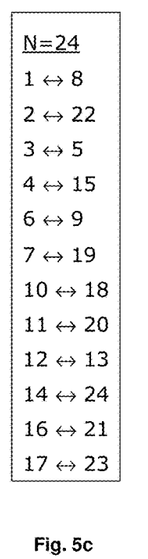

In case of a 24×24 AWG the following back ports are to be connected, wherein the port numbers are given, only: 1 ↔ 8, 2 ↔ 22, 3 ↔ 5, 4 ↔ 15, 6 ↔ 9, 7 ↔ 19, 10 ↔ 18, 11 ↔ 20, 12 ↔ 13, 14 ↔ 24, 16 ↔ 21, 17 ↔ 23 (see FIG. 5c). Here, the circulator 43 is provided in the connection 7 ↔ 19.

In this way, an odd number of N+1 optical nodes (OLTs and ONUs) can be connected to a remote node 7' having N+1 connection ports defined by an N×N AWG having an even number of front ports and an even number of back ports and an optical circulator 43. Full connectivity can be accomplished if the back ports are pairwise connected in the above-explained manner.

It shall be mentioned that this design of an RN 5' using an N×N AWG for even counts of N and pairwise connection of the back ports as well as providing an optical circulator in a connection path (preferably in the connection revealing the highest absolute difference value of the port number) may be used independently of the above-explained specific design for the ONUs 7. Generally, this design of an RN 5' can be used in a PON using single-fiber working for connecting one or more central network nodes (OLTs) and a plurality of ONUs. It is not necessary for the ONUs and the OLTs to use different optical bands (or orders of the N×N AWG) for the hub links and star links. Rather, an OLT and a plurality of ONUs may create the respective optical channel signals $S_{DS}$, $S_{US}$ and $S_{SL}$ at the appropriate channel wavelengths lying in the same optical band (or order of the N×N AWG) as defined by the routing characteristic of the RN 5'.

Figure 6:
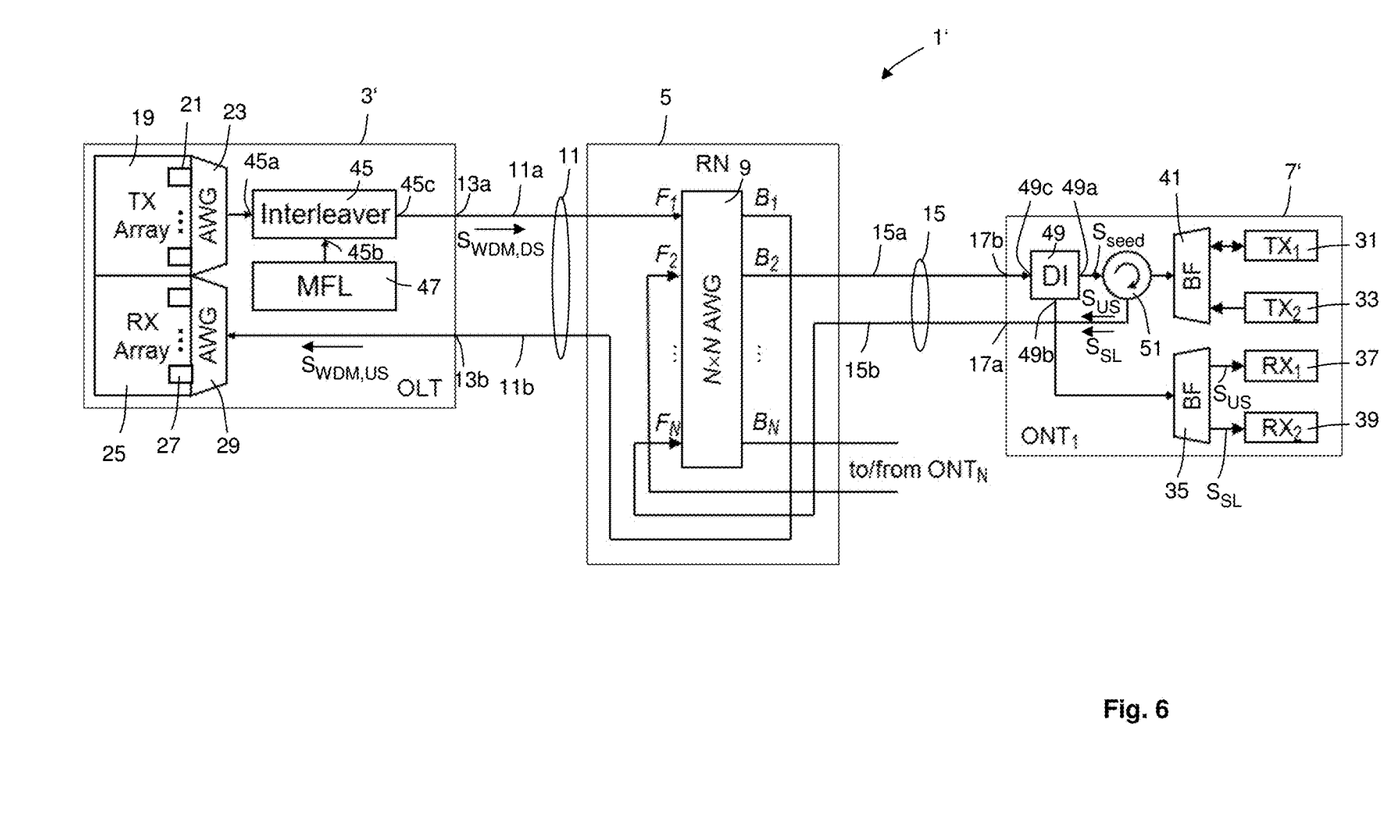
FIG. 6 shows a schematic block diagram of a PON similar to FIG. 1, wherein the ONUs comprise reflective optical transmitters, which are seeded through an optical seeding source comprised by the OLT.

FIG. 6 shows a PON 1' similar to the PON 1 in FIG. 1. Thus, in the following, the essential differences from the PON 1 are described, only. With respect to (practically) identical components and functionality reference is made to the above explanations for the PON 1 in FIG. 1. Identical components in FIG. 6 are designated with identical reference signs as the ones used for the PON in FIG. 1.

The PON 1' also uses dual-fiber working for connecting the OLT 3' to the ONUs 7'. The OLT 3' essentially has the same design as the OLT 3 but additionally includes seeding means which comprise an optical (band) interleaver having a first interleave port 45a, a second interleave port 45b and a common port 45c. The downstream WDM signal $S_{WDM;DS}$ created by the transmitter array 19 and the AWG 23 is supplied to the interleave port 45a of the optical interleaver 45. The output signal of an optical seeding source 47, which may, for example, be realized by a multi-frequency laser, is supplied to the interleave port 45b. The interleaver 45 combines these signals and outputs the combined (multiplexed) signal to the common port 45c that is connected to or defines the output port 13a of the OLT 3'.

The optical seeding source 47 is configured to create an optical seeding signals $S_{seed}$, which preferably are optical CW signals at the channel wavelengths which are used for the upstream channel signals $S_{US}$. Of course, in order to avoid overlapping of the downstream channel signals $S_{DS}$ and the seeding signal, the PON 1' uses different optical bands for the downstream and upstream channel signals $S_{DS}$ and $S_{US}$, respectively.

The optical interleaver 45 preferably reveals a cyclic or periodic transmission characteristic that corresponds to the cyclicity of the N×N AWG 9, i.e. optical signals supplied to the interleave ports 45a, 45b, which lie in neighboring optical bands (or orders of the N×N AWG 9), are multiplexed at a low insertion loss into a combined signal that is output at the common port 45c. Thus, the optical transmitter array may, for example, create downstream channel signals lying in optical bands corresponding to even orders (or corresponding optical bands) of the N×N AWG 9 and the seeding signals may be created in odd orders (or corresponding optical bands) of the N×N AWG 9.

The optical seeding source 47 may be configured to create the seeding signal in such a way that the actually required CW signals are created, only. Various methods and devices for realizing such a selective seeding source 47 are commonly known.

As shown in FIG. 6, the ONU 7' differs from the ONU 7 in the embodiment according to FIG. 1 in that an optical deinterleaver 49 and an optical circulator 51 are provided. The optical deinterleaver 49 has a common port 49c, a first deinterleave port 49a and a second deinterleave port 49b. The common port 49c is coupled to or defines the input port 17a of the ONU 7', the first deinterleave port 49a is coupled to a first port of the optical circulator and the second deinterleave port 45b is coupled to the common port of the optical band filter 41. Thus, the deinterleaver 49 separates the optical seeding signal transmitted to the respective ONU 7' from the optical downstream channel signal $S_{DS}$ and the optical star link channel signal $S_{SL}$ transmitted to the respective ONU 7'. Of course, the seeding signal supplied to the respective ONU 7' differs from the downstream channel signal supplied to the respective ONU 7' by an integer multiple of the free spectral range of the N×N AWG 9.

The seeding signal is supplied to the common port of the optical band filter 41, which outputs the seeding signal at the band port coupled to the optical transmitter 31 for generating the desired upstream channel signal $S_{US}$. The optical transmitter 31 is a reflective optical transmitter (in this description, the term "reflective optical transmitter" designates all types of optical transmitters that use an incoming optical signal for generating a desired modulated optical upstream channel signal).

The further optical transmitter 33 for creating the desired optical star link channel signal $S_{SL}$ is of the same type as in the PON according to FIG. 1. As mentioned above, the optical transmitter 33 may preferably be a tunable optical transmitter. The optical star link channel signal $S_{SL}$ created by the optical transmitter 33 is combined with the optical upstream channel signal by the band filter 41 and supplied to the optical circulator 51, which supplies both signals to the output port 17a of the ONU 7'.

The optical downstream channel signal $S_{DS}$ and the optical star link channel signal $S_{SL}$ supplied to the common port of the deinterleaver 40 are output at the deinterleave port 49b and supplied to the common port of the optical band filter 35, which separates these signals that lie in respective different optical bands as explained above with respect to the PON in FIG. 1.

The optical deinterleaver 49 may have an identical design and periodical characteristic as the optical interleaver 45, which reduces the cost for realizing the PON 1'. As mentioned above, the deinterleaver 51 separates the optical path for the optical channel signals to be received at the ONU 7' (i.e., the signals $S_{DS}$ and $S_{SL}$ to be received) and the signals to be created at the ONU 7' including the respective (incoming) seeding signal. Thus, the optical channel signals to be received, i.e. the optical channel signals for the downstream direction $S_{DS}$ and the star link channel signals $S_{SL}$, may lie in the even orders of the N×N AWG 9 (or corresponding optical bands of the optical interleaver) and the seeding signals and the star link signals $S_{SL}$ may lie in the odd orders, or vice versa.

Figure 7:
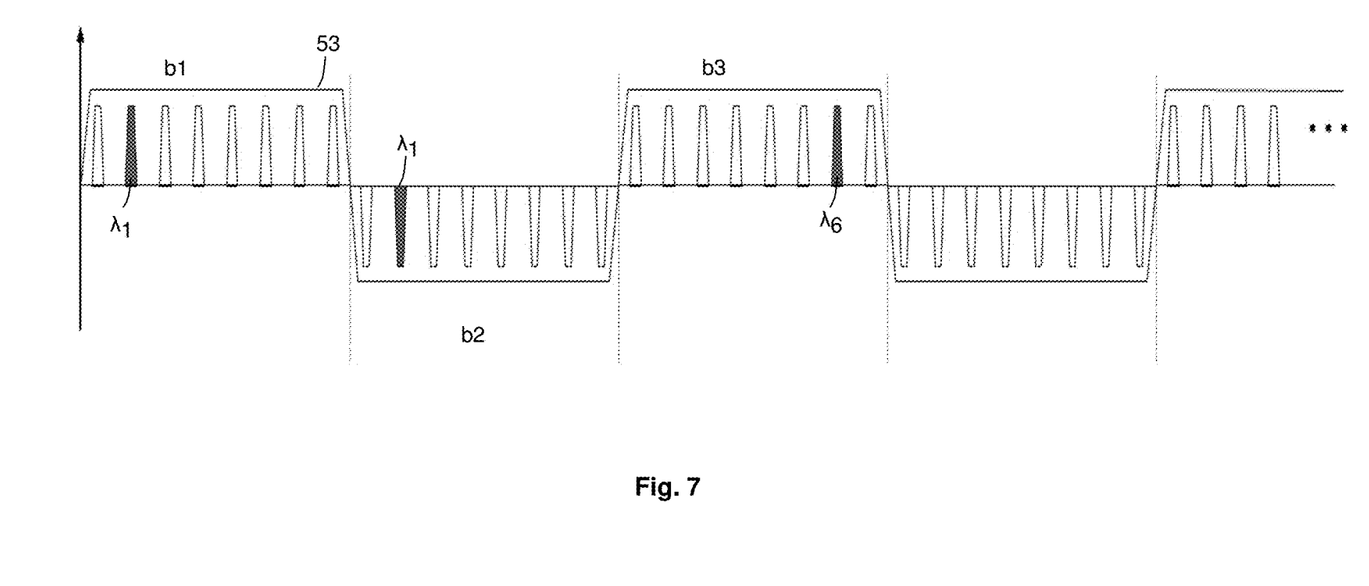
FIG. 7 shows a schematic diagram visualizing the spectrum of the optical bands used for the downstream and upstream optical channel signals and for the star link optical channel signals and the filter function of the optical interleaver and the deinterleaver in the PON according to FIG. 6.

This shall now be explained in further detail with reference to FIG. 7, which shows the spectrum of the optical bands used for the downstream and upstream optical channel signals $S_{DS}$, $S_{US}$ and for the seeding signals. In FIG. 7, by way of example, the use of eight optical channels (due to the use of an N×N AWG in FIG. 6) is illustrated.

As apparent from FIG. 7, a first optical band $b_1$ is used for the downstream channel signals, a second optical band $b_2$ is used for the upstream channel signals, i.e., also for the respective seeding signals, and a third optical band $b_3$ is used for the star link channel signals. The optical bands correspond to the filter characteristic of the interleaver 45 and the deinterleaver 49, which is illustrated as curve 53 in FIG. 7, wherein the portion of the curve 53 above the horizontal wavelength axis characterizes the bands or wavelength portions that are output at the deinterleave port 49b, and the portion of the curve 53 below the wavelength axis characterizes the bands or wavelength portions that are output at the deinterleave port 49a if a broad-band signal is supplied to the common port 49c (of course the interleave characteristic of such a "band interleaver" may be described as the capability of transmitting signals supplied to the (de-) interleave ports lying in corresponding wavelength portions or bands to the common port at a sufficiently low insertion loss).

According to the routing table shown in FIG. 2, the optical channel #1, i.e., the channel wavelength $\lambda_1$, must be used for creating the downstream channel signal $S_{DS}$ as the first ONU 7' is connected to the backport $B_2$ of the N×N AWG 9. Due to the connection and the routing characteristic of the cyclic N×N AWG 9, the seeding signal that is required for the reflective optical transmitter 31 must also be created at a wavelength $\lambda_1$ in the second optical band $b_2$ which is reserved for the upstream channel signals. As a result, the upstream channel signals created by the reflective optical transmitter 31 at the channel wavelength $\lambda_1$ (in the second optical band $b_2$) are supplied to the front port $F_N$ of the N×N AWG 9. Likewise, the output ports of the other (possibly existing) ONUs 7', which are connected, with their input ports 17a, to the back ports $B_3$ to $B_N$ are connected, with their output ports 17b, to the front ports $B_{N-1}$ to $B_2$. Of course, for any other connection scheme, that is for a given connection of the output port 13a of the OLT 3' to a given front port of the N×N AWG 9 and for given arbitrary connections of the input port 17a of the existing (at the maximum N-1) ONUs 7' to a dedicated back port of the N×N AWG, exactly one connection scheme can be found taking into account the routing table of the N×N AWG (in FIG. 2), which makes it possible that the same channel wavelength that is routed in the downstream direction from the OLT 3' to a selected ONU 7' is also routed in the upstream direction from the selected ONU 7' to the OLT 3'.

As further apparent from FIG. 7, a star link channel signal at a wavelength $\lambda_6$ in the band $b_3$ is used for a star link.

Here, it shall again be noted that a specific channel wavelength $\lambda_j$ refers to all wavelengths that differ by an integer multiple of the free spectral range of the N×N AWG 9.

As described above, using different optical bands for the hub links and the star links in a PON comprising a passive RN makes it possible to use a simple design for the ONUs as it is possible, within an ONU, to separate the optical (common) path of an optical downstream channel signal and an optical star link channel signal to be received by means of a band filter having uncritical filtering characteristics. In this respect, the filter slopes for separating the optical bands used for the signals to be received at an ONU are even less critical if non-neighboring bands or orders of the N×N AWG are used for these signals. The same applies with respect to the slope of the filter characteristics of the (band) interleaver and deinterleavers used for realizing a PON that comprises the seeding of the ONUs (with respect to the optical upstream channel signal). Here, it is also possible to use an N×N skip-k AWG (wherein k may, for example, be equal to 1, 2 or 3).

LIST OF REFERENCE SIGNS 1, 1' Optical WDM transmission network/realized as passive optical network (PON)
3 optical line terminal (OLT)
5, 5' remote node (RN)
7, 7' optical network unit (ONU)
9 N×N arrayed waveguide grating (AWG)
11 optical WDM path
11a downstream feeder fiber
11b upstream feeder fiber
13 optical connection port of OLT 3
13a OLT output port
13b OLT input port
15 optical distribution path
15a downstream distribution fiber
15b upstream distribution fiber
17 optical connection port of an ONU 7
17a output port of an ONU 7
17b input port of an ONU 7
19 optical transmitter array
21 optical transmitter
23 1×N AWG
23a WDM port
25 optical receiver array
27 optical receiver
29 1×N AWG
29a WDM port
31 first optical transmitter
33 second optical transmitter
35 optical band filter
37 first optical receiver
39 second optical receiver
41 optical band filter
43 optical circulator
45 optical (band) interleaver
45a first interleave port
45b second interleave port
45c common port
47 optical seeding source
49 optical deinterleaver
49a first interleave port
49b second interleave port
49c common port
51 optical circulator
53 curve
$b_1$ first optical band
$b_2$ second optical band
$b_3$ third optical band
$B_i$ back port; $1 \leq i \leq N$
$F_i$ front port; $1 \leq i \leq N$
$\lambda_j$ channel wavelength; $0 \leq j \leq N-1$
$S_{DS}$ optical downstream channel signal
$S_{US}$ optical upstream channel signal
$S_{SL}$ optical star link channel signal
$S_{WDM, DS}$ optical downstream WDM signal
$S_{WDM, US}$ optical upstream WDM signal
$S_{seed}$ seeding signal (at a channel wavelength)

The invention claimed is:
1. An optical WDM transmission network comprising at least one optical line terminal, a remote node and a plurality of optical network units, wherein

(a) the at least one optical line terminal is connected to the optical remote node via an optical WDM path,
(b) each optical network unit is connected to the optical remote node via an optical distribution path,
(c) the optical remote node comprising a cyclic N×N arrayed waveguide grating has connection ports for connecting the at least one optical line terminal and the plurality of optical network units to the optical remote node, the cyclic N×N arrayed waveguide grating having wavelength-depending routing properties being configured in such a way that bidirectional hub links via the optical remote node between the at least one optical line terminal and each of the optical network units can be established and being further configured in such a way that direct bidirectional star links via the optical remote node between one or more selected optical network unit and at least one of the other optical network unit can be established, the wavelength-dependent routing properties of the cyclic N×N arrayed waveguide grating being essentially identical in a first optical band, a second optical band, and a third optical band, the first, second and third optical band having no overlap,
(d) wherein, for establishing the hub links, the at least one optical line terminal creates optical downstream channel signals at first wavelengths lying in the first optical band and each of selected one or more optical network units creates an optical upstream channel signal at a dedicated second wavelength lying in the second optical band and wherein, for establishing the direct star links, each of selected one or more optical network units creates an optical star link channel signal at a dedicated third wavelength lying in the third optical band,
(e) each of the selected optical network units further comprising a first optical band filter device comprising a common port and a first band port and a second band port, a first optical receiver connected to the first band port and a second optical receiver coupled to the second band port, the first optical receiver being adapted to receive an optical downstream channel signal lying in the first optical band for establishing a hub link and the second optical receiver adapted to receive an optical channel signal lying in the third optical band for establishing a direct star link,
(f) wherein the optical band filter device is configured to route an optical channel signal supplied to the common port and lying in the first optical band to the first band port and to route an optical channel signal supplied to the common port and lying in the third optical band to the second band port,
(g) wherein the optical line terminal and each optical network unit have a connection port comprising a separate output port and a separate input port, wherein the output port of the optical line terminal and each output port of an optical network unit are connected to a dedicated front port of the cyclic N×N arrayed waveguide grating and wherein the input port of the optical line terminal and each input port of an optical network unit are connected to a dedicated back port of the cyclic N×N arrayed waveguide grating by a separate optical path.

2. The optical WDM transmission network according to claim 1, wherein selected one or more of all optical network units comprise a first optical transmitter adapted to create the respective optical upstream channel signal for establishing the hub link at a dedicated wavelength lying in the second optical band, and that selected one or more of all optical network units comprise a second optical transmitter adapted to create an optical star link channel signal for establishing a direct star link at a dedicated wavelength lying in the third band, the optical upstream and star link channel signals created by the first and the at least one second transmitters being supplied to a connection port of the optical network unit.

3. The optical WDM transmission network according to claim 2, wherein
(a) each of the selected optical networks units further comprises a second optical band filter device comprising a common port and a first band port and a second band port, the first optical transmitter connected to the first band port and a second optical transmitter coupled to the second band port, the first optical transmitter being adapted to create an optical upstream channel signal at a channel wavelength lying in the second optical band for establishing a hub link and the second optical transmitter adapted to create an optical channel signal at a channel wavelength lying in the third optical band for establishing a direct star link,
(b) wherein the second optical band filter device is configured to route the optical upstream channel signal created by the first optical transmitter and supplied to the first band port to the common port and to route the optical star link channel signal created by the second optical transmitter and supplied to the second band port to the common port.

4. The optical WDM transmission network according to claim 2, wherein the second optical transmitter is a tunable optical source, the tunable optical source being able to create an optical star link channel signal having any desired wavelength within the third optical band.

5. An optical WDM transmission network comprising at least one optical line terminal, a remote node and a plurality of optical network units, wherein
(a) the at least one optical line terminal is connected to the optical remote node via an optical WDM path,
(b) each optical network unit is connected to the optical remote node via an optical distribution path,
(c) the optical remote node comprising a cyclic N×N arrayed waveguide grating has connection ports for connecting the at least one optical line terminal and the plurality of optical network units to the optical remote node, the cyclic N×N arrayed waveguide grating having wavelength-depending routing properties being configured in such a way that bidirectional hub links via the optical remote node between the at least one optical line terminal and each of the optical network units can be established and being further configured in such a way that direct bidirectional star links via the optical remote node between one or more selected optical network unit and at least one of the other optical network unit can be established, the wavelength-dependent routing properties of the cyclic N×N arrayed waveguide grating being essentially identical in a first optical band, a second optical band, and a third optical band, the first, second and third optical band having no overlap,
(d) wherein, for establishing the hub links, the at least one optical line terminal creates optical downstream channel signals at first wavelengths lying in the first optical band and each of selected one or more optical network units creates an optical upstream channel signal at a dedicated second wavelength lying in the second optical band and wherein, for establishing the direct star links, each of selected one or more optical network units creates an optical star link channel signal at a dedicated third wavelength lying in the third optical band, (e) each of the selected optical network units further comprising a first optical band filter device comprising a common port and a first band port and a second band port, a first optical receiver connected to the first band port and a second optical receiver coupled to the second band port, the first optical receiver being adapted to receive an optical downstream channel signal lying in the first optical band for establishing a hub link and the second optical receiver adapted to receive an optical channel signal lying in the third optical band for establishing a direct star link, (f) wherein the optical band filter device is configured to route an optical channel signal supplied to the common port and lying in the first optical band to the first band port and to route an optical channel signal supplied to the common port and lying in the third optical band to the second band port, (g) wherein the optical line terminal and each optical network unit have a connection port comprising a combined input/output port, wherein the respective input/output port of the optical line terminal and each optical network unit are connected to a dedicated front port of the cyclic N×N arrayed waveguide grating and wherein the back ports of the cyclic N×N arrayed waveguide grating are connected pairwise.

6. The optical WDM transmission network according to claim 5, wherein the pairwise connection of the back ports of the cyclic N×N arrayed waveguide grating is done in such a manner that all possible differences between the numbers of the connected back ports taken modulo N cover all numbers from 1 to N−1.

7. The optical WDM transmission network according to claim 1, wherein the optical line terminal and each optical network unit comprise a connection port comprising a combined input/output port, wherein the input/output ports of the optical network units are connected to a respective dedicated front port of the cyclic N×N arrayed waveguide grating and that the input/output port of the optical line terminal is connected to a dedicated back port of the cyclic N×N arrayed waveguide grating, wherein the remaining back ports of the cyclic N×N arrayed waveguide grating are connected pairwise.

8. An optical WDM transmission network comprising at least one optical line terminal, a remote node and a plurality of optical network units, wherein (a) the at least one optical line terminal is connected to the optical remote node via an optical WDM path, (b) each optical network unit is connected to the optical remote node via an optical distribution path, (c) the optical remote node comprising a cyclic N×N arrayed waveguide grating has connection ports for connecting the at least one optical line terminal and the plurality of optical network units to the optical remote node, the cyclic N×N arrayed waveguide grating having wavelength-depending routing properties being configured in such a way that bidirectional hub links via the optical remote node between the at least one optical line terminal and each of the optical network units can be established and being further configured in such a way that direct bidirectional star links via the optical remote node between one or more selected optical network unit and at least one of the other optical network unit can be established, the wavelength-dependent routing properties of the cyclic N×N arrayed waveguide grating being essentially identical in a first optical band, a second optical band, and a third optical band, the first, second and third optical band having no overlap, (d) wherein, for establishing the hub links, the at least one optical line terminal creates optical downstream channel signals at first wavelengths lying in the first optical band and each of selected one or more optical network units creates an optical upstream channel signal at a dedicated second wavelength lying in the second optical band and wherein, for establishing the direct star links, each of selected one or more optical network units creates an optical star link channel signal at a dedicated third wavelength lying in the third optical band, (e) each of the selected optical network units further comprising a first optical band filter device comprising a common port and a first band port and a second band port, a first optical receiver connected to the first band port and a second optical receiver coupled to the second band port, the first optical receiver being adapted to receive an optical downstream channel signal lying in the first optical band for establishing a hub link and the second optical receiver adapted to receive an optical channel signal lying in the third optical band for establishing a direct star link, (f) wherein the optical band filter device is configured to route an optical channel signal supplied to the common port and lying in the first optical band to the first band port and to route an optical channel signal supplied to the common port and lying in the third optical band to the second band port, (g) wherein the optical line terminal and each optical network unit comprise a connection port comprising a combined input/output port, wherein the respective input/output port of each optical network unit is connected to a dedicated front port of the cyclic N×N arrayed waveguide grating, wherein the back ports of the cyclic N×N arrayed waveguide grating are connected pairwise, and wherein an optical circulator is provided within an optical connection path, which connects a pair of back ports.

9. The optical WDM transmission network according to claim 8, wherein the pairwise connection of the back ports of the cyclic N×N arrayed waveguide grating is done in such a manner that all possible differences between the numbers of the connected back ports taken modulo N cover all numbers from 1 to N−1 and that the optical circulator is provided within the optical connection path which connects the pair of two back ports having the greatest absolute difference of the port numbers.

10. The optical WDM transmission network according to claim 2, wherein the optical network units and the optical line terminal are configured to create the optical upstream channel signals and the downstream channel signals in different optical bands and that the OLT is configured to create seeding channel signals at channel wavelengths lying in the second optical band which are used by first optical transmitters, which are reflective optical transmitters, to create the respective upstream channel signals.

11. The optical WDM transmission network according to claim 3, wherein the second optical band filter device reveals an identical design as the first optical band filter device.

12. The optical WDM transmission network according to claim 4, wherein the tunable optical source is a tunable optical laser.

13. The optical WDM transmission network according to claim 1, wherein the separate optical path is an optical fiber.

14. The optical WDM transmission network according to claim 5, wherein N is even.

15. The optical WDM transmission network according to claim 7, wherein N is odd.

16. The optical WDM transmission network according to claim 8, wherein N is even.

\* \* \* \* \*